United States Patent
Colombano et al.

(10) Patent No.: US 10,861,256 B1
(45) Date of Patent: Dec. 8, 2020

(54) SYSTEM FOR FAILURE RESPONSE ADVICE BASED ON DIAGNOSED FAILURES AND THEIR EFFECT ON PLANNED ACTIVITIES

(71) Applicant: USA as Represented by the Administrator of the National Aeronautics and Space Administration, Washington, DC (US)

(72) Inventors: Silvano P. Colombano, Pacifica, CA (US); Liljana Spirkovska, Sunnyvale, CA (US); Paul H. Morris, Mountain View, CA (US)

(73) Assignee: United States of America as Represented by the Administrator of NASA, Washington, DC (US)

(*) Notice: Subject to any disclaimer, the term of this patent is extended or adjusted under 35 U.S.C. 154(b) by 430 days.

(21) Appl. No.: 15/249,912

(22) Filed: Aug. 29, 2016

Related U.S. Application Data (60) Provisional application No. 62/211,577, filed on Aug. 28, 2015.

(51) Int. Cl.
  *G07C 5/08* (2006.01)
  *B64G 1/52* (2006.01)

(52) U.S. Cl.
  CPC .......... *G07C 5/0808* (2013.01); *B64G 1/52* (2013.01); *G07C 5/0825* (2013.01)

(58) Field of Classification Search
  CPC ...... G07C 5/0808; G07C 5/0825; B64G 1/52; G06Q 10/0635; G05B 23/0283; B60R 16/0232; B60R 16/0234
  See application file for complete search history.

(56) References Cited

U.S. PATENT DOCUMENTS

| | | | | |
|---|---|---|---|---|
| 9,811,086 B1* | 11/2017 | Poeppel | ................ | G07C 5/008 |
| 10,559,140 B2* | 2/2020 | Nix | .................... | G01C 21/3697 |
| 2003/0217256 A1* | 11/2003 | Gilstrap | .............. | G06F 11/2035 |
| | | | | 713/100 |

(Continued)

OTHER PUBLICATIONS

Marquez, J. et al. "Evolving from Planning and Scheduling to Real-Time Operations Support: Design Challenges," In Proceedings of 40th International Conference on Environmental Systems. Barcelona, Spain, 2010.

(Continued)

*Primary Examiner* — Robert T Nguyen
(74) *Attorney, Agent, or Firm* — Rhys W. Cheung; Robert M. Padilla (57) ABSTRACT

A system and method of warning and planning failure responses using an automated failure response system including, providing an electro-mechanical system having mechanical and electrical components and providing a failure response system for diagnosing failures of the components. The failure response system then determines effects of said failures on carrying out system activities using the failure response system, quantifies a severity for each failure diagnosed by the failure response system, and identifies repairs for each component failure. The failure response system also prioritizes each failure of a component based on severity and then recommends which repairs should be prioritized as most urgent to keep the electro-mechanical system operational based upon the severity of the associated failures and the effects of their corresponding failure.

13 Claims, 10 Drawing Sheets

(56) References Cited

U.S. PATENT DOCUMENTS

| | | | | |
|---|---|---|---|---|
| 2004/0138852 | A1* | 7/2004 | Everts | G01R 31/2817 |
| | | | | 702/179 |
| 2005/0038632 | A1* | 2/2005 | Boutin | G05B 9/02 |
| | | | | 702/183 |
| 2011/0087517 | A1* | 4/2011 | Abbott | G05B 23/0283 |
| | | | | 705/7.28 |
| 2013/0190095 | A1* | 7/2013 | Gadher | G06F 11/008 |
| | | | | 463/42 |
| 2014/0288761 | A1* | 9/2014 | Butler | G07C 5/0816 |
| | | | | 701/29.6 |
| 2015/0278219 | A1* | 10/2015 | Phipps | G06F 16/951 |
| | | | | 707/711 |
| 2016/0052470 | A1* | 2/2016 | Shore | B60R 16/0234 |
| | | | | 701/29.1 |
| 2017/0241955 | A1* | 8/2017 | Meck | G01M 13/005 |
| 2017/0257303 | A1* | 9/2017 | Boyapalle | H04L 67/34 |
| 2018/0060832 | A1* | 3/2018 | Korsedal, IV | G01M 99/005 |
| 2018/0089912 | A1* | 3/2018 | Penilla | G06Q 10/20 |

OTHER PUBLICATIONS

Spirkovska, L. et al. "Advanced Caution and Warning System, Final Report—2011," NASA/TM-2013-216510, Mar. 2013.

Colombano, S. et al. "From Diagnosis to Action: An Automated Failure Advisor for Human Deep Space Missions," American Inst. of Aeronautics and Astronautics; AIAA Space 2015, Pasadena, CA; Aug. 2015.

Colombano, S. et al. "A System for Fault Management and Fault Consequences Analysis for NASA's Deep Space Habitat," AIAA Space 2013 Conference & Exposition, San Diego, CA, Sep. 2013.

Morris, Paul et al. "Integrating System Health Management and Planning & Scheduling to Determine & Recover from System Failure Effects", Systems Demonstrations and Exhibits program, 24th International Conference on Automated Planning and Scheduling (ICAPS 2014), Portsmouth, NH, Jun. 2014.

\* cited by examiner

| | Found in |
|---|---|
| EST = Earliest Start Time | Activity Dictionary |
| LET = Latest End Time | Activity Dictionary |
| AST = Activity Start Time | Activity Dictionary |
| AET = Activity End Time | Activity Dictionary |
| AD = Activity Duration | Computed |
| ED = Effect Delay | Activity Table |
| CED = Critical Effect Time | Computed |
| TEA = Time of Activity Expiration | Mission Timeline |

A. From the histogram:

|    | CV=1 | CV=2 | CV=3 |
|----|------|------|------|
| F1 | 1    | 2    | 5    |
| F2 | 0    | 2    | 1    |
| F3 | 2    | 1    | 3    |
| F4 | 0    | 3    | 2    |

B. Change to percentages, concatenate and take the log:

|    | CV=1 | CV=2 | CV=3 | Concatenation | Log |
|----|------|------|------|---------------|-----|
| F1 | 20   | 40   | 99   | 204099        | 5.3 |
| F2 | 0    | 40   | 20   | 004020        | 3.6 |
| F3 | 40   | 20   | 60   | 402060        | 5.6 |
| F4 | 0    | 60   | 40   | 006040        | 3.8 |

Fig. 6

| File | Panes | Data | CommonalityQuery | Next Worst Failure Query | SupposeQuery |
|------|-------|------|------------------|--------------------------|--------------|

EX FD SE AD FI

Failure Analysis  ☐✱☐✕

202 20:13:21 GMT                                                    Data: 000 00:00:00

Publish Time: 202 20:13:22 GMT

| Severity | Latest Start Time | Time Remaining | Failure Mode |
|----------|-------------------|----------------|--------------|
| 5.4 | 203 05:16:25 | 001 09:03:02 | CM SM R&R Fail |
| 7.9 | 205 22:20:30 | 003 02:07:08 | C4ADIOChan600CCDOpen |
| 7.5 | 204 23:24:42 | 002 03:09:20 | MrtrFacingFBHSCamLoss |

Fig. 7

Failure Detail                                        x

MtrFacingFBHSCamLoss

Severity                7.5

Latest Start Time       204 23:24:42

Affected Activities

| Criticality | Activity |
|---|---|
| 3 | CamOps Post-HighRad2 |
| 3 | FBC & Drogue: Chute Act |
| 2 | FBC & Drogue: Arm |
| 1 | FBC Jett & Drogue Deploy |
| 3 | Pilot Chute: Act |
| 3 | CamOps Post – Blackout |

Fig. 8

Activity Data

| FBC Jett & Drogue Deploy | |
|---|---|
| Criticality | 1 |
| Earliest Start Time | 205 04:20:37 |
| Latest End Time | 205 06:15:04 |
| Nominal Start Time | 205 05:06:25 |
| Duration | 000 00:10:20 |
| Explanation | *Deployment of Drogue Chute is crucial for Chute deployment and safe re-entry* |
| Pre-conditions | Arm_for_FBC_Jettison_and_Drogue_Deploy |
| Required Components | FORWARD-BAY-COVER-PARACHUTE-MORTAR-1_CFBCCM1<br>FORWARD-BAY-COVER-PARACHUTE-MORTAR-2_CFBCCM2<br>FORWARD-BAY-COVER-PARACHUTE-MORTAR-3_CFBCCM3<br>FORWARD-BAY-COVER-PISTON-THRUSTER-1_CFBCJT1<br>FORWARD-BAY-COVER-PISTON-THRUSTER-2_CFBCJT2<br>FORWARD-BAY-COVER-PISTON-THRUSTER-3_CFBCJT3<br>DROGUE-PARACHUTE-MORTAR-1_CDMORT1<br>DROGUE-PARACHUTE-MORTAR-2_CDMORT2 |

SYSTEM FOR FAILURE RESPONSE ADVICE BASED ON DIAGNOSED FAILURES AND THEIR EFFECT ON PLANNED ACTIVITIES

CROSS-REFERENCE TO RELATED APPLICATIONS

This application claims the benefit of U.S. Provisional Application No. 62/211,577, filed Aug. 28, 2015, which is hereby incorporated by reference in its entirety.

ORIGIN OF INVENTION

The invention described herein was made by employees of the United States Government and may be manufactured and used by or for the Government of the United States of America for governmental purposes without payment of any royalties thereon or therefor.

BACKGROUND OF INVENTION

1. Technical Field of the Invention

This invention relates generally to the field of component and operations failure response systems in spacecraft, vehicles, or other electro-mechanical devices and providing recommended repairs and system operations.

2. Description of Related Art

One of the key objectives of current space system development is to enable human travel to deep space locations such as Mars and asteroids. At such a distance, round trip communication with ground operators may take close to an hour. Thus, it becomes infeasible to seek ground operator advice for problems that require immediate attention, either for crew safety or for activities that need to be performed at specific times for the attainment of scientific results.

To achieve deep space human missions, major reliance will likely need to be placed on automation systems capable of aiding the crew in detecting and diagnosing failures, assessing consequences of these failures, and providing guidance in repair activities that may be required. A system that provides some of these capabilities has been developed and continues further development, the Advanced Caution and Warning System, or main diagnostic system, which combines dynamic and interactive graphical representations of spacecraft systems and uses a system model for diagnostic analysis and failure consequences analysis. This diagnostic system has been tested on the Deep Space Habitat laboratory and with telemetry data.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

SUMMARY OF THE INVENTION

The present invention provides a method of warning and planning failure responses using an automated failure response system including providing an electro-mechanical system having mechanical and electrical components and providing a failure response system for diagnosing failures of the components. The failure response system then determines effects of these failures on carrying out system activities using the failure response system, quantifies a severity for each failure diagnosed by the failure response system, and identifies repairs for each component failure. The failure response system also prioritizes each failure of a component based on severity and then recommends which repairs should be prioritized as most urgent to keep the electro-mechanical system operational based upon the severity of the associated failures and the effects of their corresponding failure.

In accordance with one illustrative aspect of the present invention, there is provided a failure response system for warning and planning repairs of component failures having an electro-mechanical system having mechanical and electrical components, a diagnostic module that identifies failures of the components, a processor, a memory coupled to the processor, and computer-readable instructions stored in the memory. The computer-readable instructions, when executed by the processor, cause the processor to: determine effects of the failures on carrying out system activities using the failure response system, identify activities that are affected by the failures of components, quantify a severity for each failure diagnosed by the failure response system, identify repairs for each component failure, prioritize each failure of the component based on severity, and recommend which repairs should be made based on the prioritizing of each component failure and the severity of the corresponding failures to keep the electro-mechanical system operational.

In accordance with another illustrative aspect of the present invention, there is provided a failure response system for warning and planning repairs of component failures having an electro-mechanical system having mechanical and electrical components, a means for diagnosing failures of the components, a means for determining effects of said failures on carrying out system activities, using the failure response system, a means for identifying activities that are affected by the failures of components, a means for quantifying a severity for each failure diagnosed by the failure response system, a means for identifying repairs for each component failure, a means for prioritizing each failure of the component based on severity, and a means for recommending which repairs should be made based on the prioritizing of each component failure and the severity of the corresponding failures to keep the electro-mechanical system operational.

These and other advantages are achieved in accordance with various illustrative embodiments of the present invention as described in detail below.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the illustrative embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

The present invention provides a main diagnostic system of an electro-mechanical device, such as a vehicle or spacecraft, with a sub-system or module that enables an automation capable of aiding a crew in detecting and diagnosing failures, assessing consequences of these failures, and providing guidance in repair activities that may be required. This system is called a Failure Response Advisor (FRAd), or failure response system 100, illustrated by the schematic flow chart in FIG. 1. The failure response system 100 includes a processor coupled with a memory. The failure response system also includes computer-readable instructions stored in the memory that, when executed by the processor, can cause the processor to execute each of the steps of the failure response system discussed below.

The severity of faults detected by the failure response system 100 depends on the criticality of activities that have been blocked or prevented by such faults. Severity and criticality indicate specific distinct concepts that are explained and defined in more detail herein. Development of the failure response system adds a crucial automation step that would be necessary in a situation where ground support would be hampered by the long latencies expected on missions to Mars's vicinity and beyond.

Figure 1:
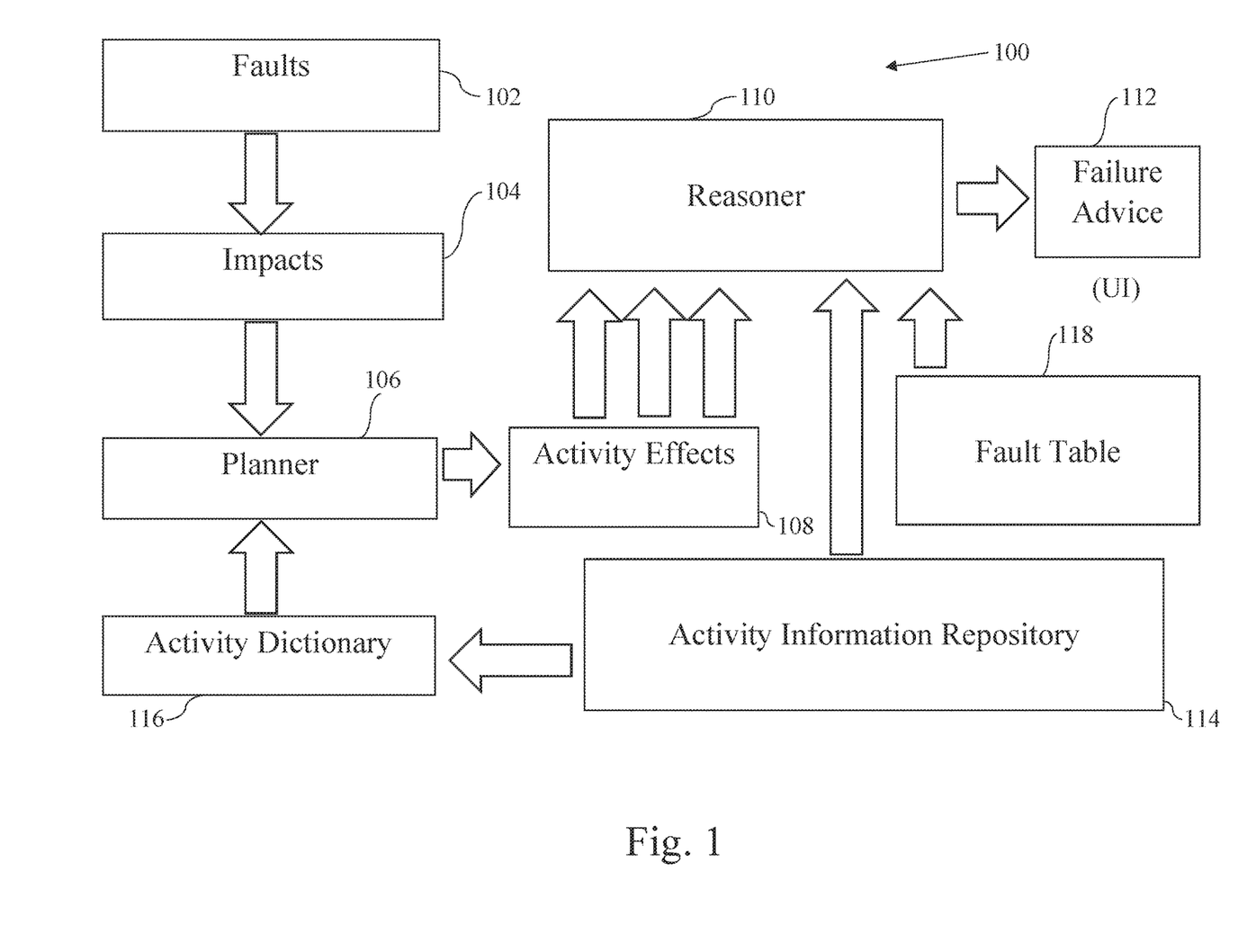
FIG. 1 is a flow diagram of system and operation of a failure response system according to an illustrative embodiment of the present disclosure.

As shown in FIG. 1, the failure response system 100 architecture implements the following steps. First, faults 102, or faulty components, and impacts 104, or impacted components, are identified and diagnosed by the existing main diagnostic system (not shown). These components typically constitute resources that would be needed to perform mission activities (both human and automated). Second, the failure response system 100 uses a Planner 106, or planning module, to determine what activities are blocked, activity effects 108, by the absence of these resources, together with the corresponding number and criticality. Third, the number and criticality of these activities forms the basis for a computation of a severity value for each of the responsible faults. Fourth, information on faulty components and suggested repair timings is determined by a Reasoner or reasoner module 110, and such information is provided to a user via Failure Advice 112 using a user interface.

A component will be determined to have "failed" or have a "fault" ("faults" and "failures" can be used interchangeably here) by the main diagnostic system based on the system specific model and incoming telemetry values, which are analyzed by the main diagnostic system. This "failure" indicates that some function the component was designed to perform is no longer available. A fault can only be remedied by direct repair of the component or by exchange with a new working component. A faulty component will generally cause other components to cease functioning, for example, a faulty power supply may cause a light to be off. In this case it could be said that the light bulb has been "impacted" but has not "failed". Repairing the power supply will return the bulb to its full functionality (unless the light bulb coincidentally also failed). No repair or substitution is needed for the bulb.

A typical diagnosis of a fault can be accompanied by a list of "impacted" components. These impacted components will not necessarily be in need of repair. Repair or substitution of the original faulty components will re-establish the functionality of all impacted components.

Other defined components of the failure response system 100 are those of "criticality" and "severity," which can often be used interchangeably. Criticality is associated with mission activities of and, in use with the failure response system 100, it has a value that starts with "1" for activities that are crucial for astronaut survival and/or mission accomplishment, and may range to 3 or higher integers for less crucial activities, depending on classification of other activities, such as selected science, spacecraft maintenance, comfort activities, and the like. The criticality value of any given activity is specified a priori based on the mission designers' knowledge of the role of that activity in the mission. For example, the opening of a parachute at re-entry will usually be crucial enough for crew safety to merit a criticality of "1". A particular science experiment might be highly desirable, but not crucial to the overall mission, and thus may merit a criticality of "2" or "3", and so on. Criticality is not associated with individual components.

A component, or the components impacted by that component's failure, might be used by a number of activities of different criticality to the mission. Moreover, a component may be a necessary resource for a critical activity early in the mission, but its failure may not affect any activities later in the mission; thus, its loss of functionality would then be irrelevant. To accommodate the changing importance of components in different contexts during a mission, a "severity" value is assigned to each failure.

Given the above criticality and severity categories and definitions, as used in the failure response system 100, it becomes clear that a component failure, together with its impacted components, that blocks more activities of a given criticality than another component failure blocks, will have a greater negative effect on the mission. Similarly, a failure or impact that blocks an activity of high criticality has a greater negative effect on a mission than a failure that blocks an activity with lower criticality. Thus, the failure response system compares different faults according to the number and the criticality of blocked activities.

FIG. 1 illustrates how the failure response system 100 computes severity values. The failure response system 100 includes modules for diagnosis and system effects that identify faults 102 and impacts 104 and deliver that information to the Planner 106. The Planner 106 gathers information about activities from an Activity Dictionary 116. This information includes what resources are needed for given activities to be performed. The Planner 106 correlates fault 102 and impact 104 information with its effect on activities 108 to be performed and delivers the correlated information to the failure response Reasoner 110. The Activity Information Repository 114, contains the activity information required by the Activity Dictionary 116 to define given activities (include time duration, and objectives) and additional timing information required by the Reasoner 110. Additional information on faults is contained in a Fault Table 118 and is delivered, as needed, to the Reasoner 110, which computes fault severity, repair timing suggestions, and provides the advice to be published on the user interface 112. The actions of all these components are explained in greater detail below.

The Planner 106 or planning system is based on a tool called SPIFe that has been used extensively at NASA for activity planning. SPIFe is used for plan creation, validation, and editing. It reports on plan violations and relies on the user or other automated planner to repair these violations. These violations may include user-specified temporal constraints, over-subscribed resources, or failure to meet state requirements.

The role of the Planner 106 in failure response system 100 is to detect violations in the resources required to perform the set of planned activities. A failed or impacted component will typically be a resource for some planned activity, and the Planner 106 will check every activity, as stored in its Activity Dictionary, and will flag "activity violations" as a result of failed or impacted components that were needed as resources. The Activity Dictionary 116 forms a static model of the application domain and allows specification of state variables, resource types, resource limits, and state requirements.

For activities where violations have been identified ("blocked" activities), SPIfe will report timing information and Criticality Values. Activities can also be pre-requisites for other activities, and pre-requisite activities are treated as a type of resource as well, which, if missing, will block other activities. For example, a single fault can initiate a long cascade of consequences. First the fault can cause a chain of "impacts" among other components, then every faulty or impacted component will generally become a missing resource that will block the performance of planned activities.

If any of these activities is a pre-requisite for other activities, those activities will be blocked as well. The Planner 106 in the failure response system 100, determines the full list of blocked activities and sends it to the Reasoner 106 together with the identity of the original fault that started the chain. Note that it is assumed that repair of the original fault (or faults) will re-establish the functionality of all impacted components and will allow the performance of all planned activities by making all needed resources available again.

One of the basic assumptions made by the failure response system 100 is that there is information about activities and faults that can only be known a priori from an understanding of mission requirements and mission hardware and software. The role of the failure response system 100 is to identify the relevant information and to use it to compute the severity of faults and repair times.

Figure 2:
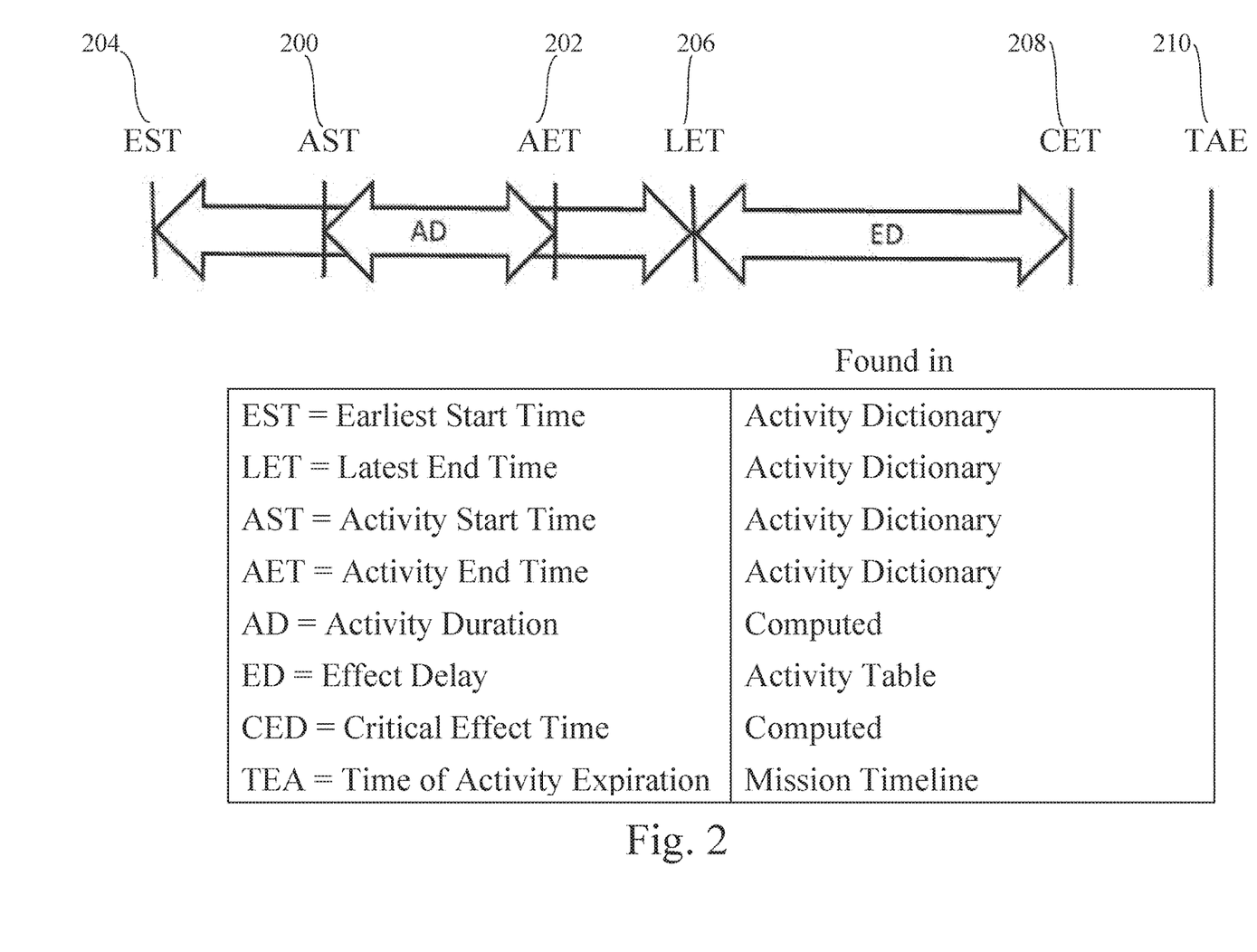
FIG. 2 is an activity timeline according to an illustrative embodiment of the present disclosure.

All activity information is stored in the Activity Information Repository 114. This includes timing information, as shown in FIG. 2, Criticality Value, and an explanation for this value, to be displayed on the user interface if requested. All these values can only be known or estimated from an understanding of the mission, which is the province of mission designers and systems engineers. For a real mission, mission designers and systems engineers would be required to provide this information. This is also how the Activity Dictionary used by the planner is constructed. An even more comprehensive Activity Information Repository can also inform both the Activity Dictionary and the Reasoner.

Shown in FIG. 2, all values named "time" are points in time. Time intervals are called "duration" or "delay," and in the failure response system 100 time intervals are computed from the time values. Activities will typically be scheduled for a particular Start Time (AST, 200) and End Time (AET, 202), but there may be flexibility in the mission plan that will allow the activity to be started earlier, up to an Earliest possible Start Time (EST, 204), and ended later, up to a Latest End Time (LET, 206).

The Critical Effect Time (CET, 208), is the time when the consequences of a blocked activity would actually be registered by the system as an undesirable effect. For example, the desired closing of a valve may have been prevented by a faulty component. The consequence of this blocked activity would be the loss of a fluid, but the space craft system might not be affected until the fluid is actually depleted some time later. The Time of Activity Expiration (TAE, 210) is a time when the activity has become obsolete and, even if repairs are accomplished, the activity is no longer needed. For example, imaging of an asteroid planned during a flyby would be blocked by a power supply failure. Once the spacecraft flies past the asteroid and beyond the ability of the imaging system, even if the power supply is repaired, the activity is obsolete.

All the timing elements of FIG. 2 are required to decide if and when repairs will be possible and/or needed, and will serve as constraints for the planning system to schedule repair activities and re-schedule previously planned activities as needed. For this implementation of the failure response system 100, the advice provided is only based on the overall criticality of blocked activities and initial timing constraints without further invocation of the planner.

Figure 3:
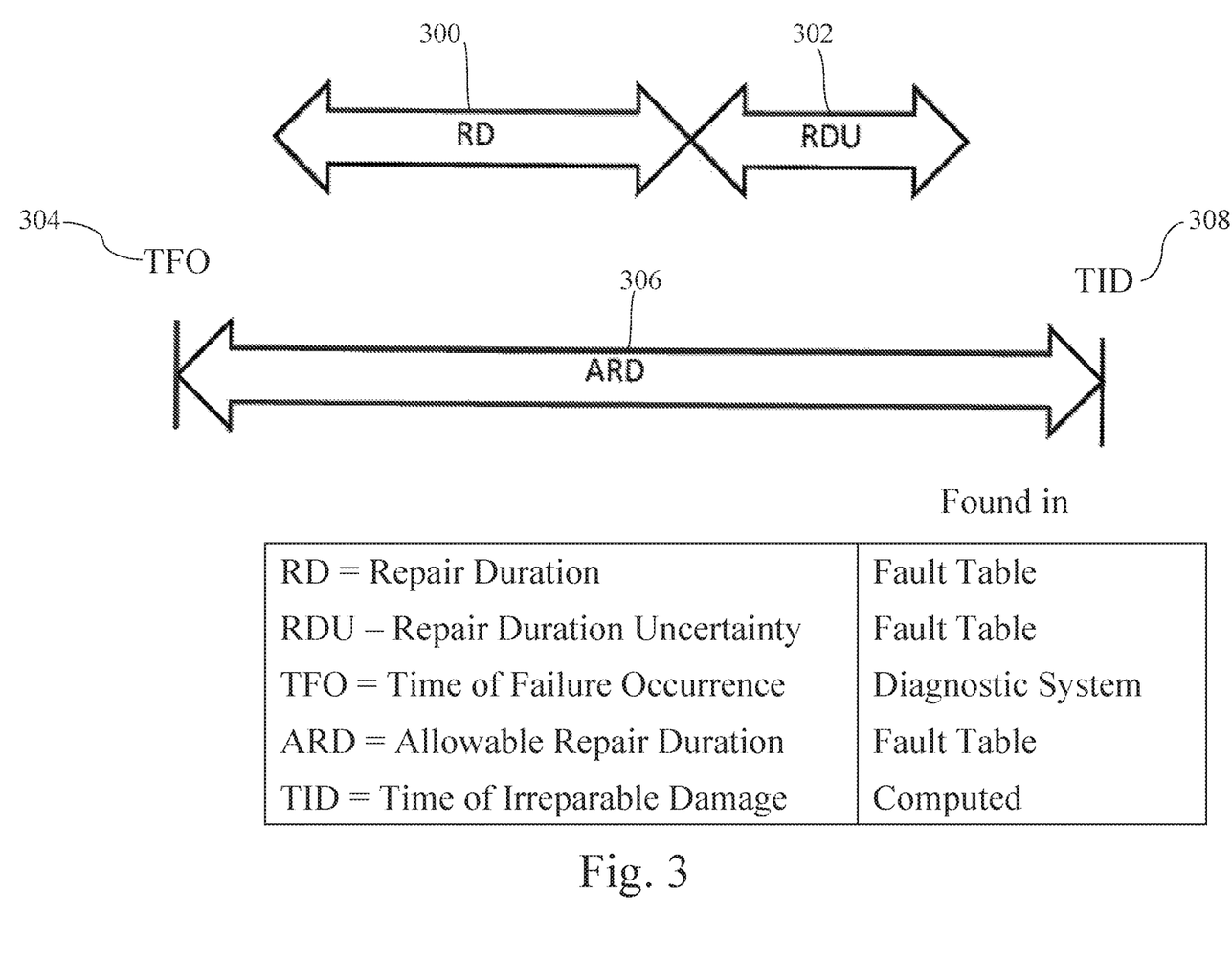
FIG. 3 is a repair timeline according to an illustrative embodiment of the present disclosure.

As illustrated in FIG. 3, for any particular component it is assumed that systems engineers can provide information on how long the repair duration (RD, 300) and uncertainty of this number (RDU, 302) would be. The Time of Failure Occurrence (TFO, 304) is provided by the main diagnostic system and associated telemetry information. Allowable Repair Duration (ARD, 306) captures the situation where, for some components, unless repairs are done within a specified period of time, the component would be permanently damaged (TID, 308). For example, a computer might not fail immediately with the failure of a cooling fan, but, unless the fan is fixed or replaced within a given period of time, the computer will be irreparably damaged.

Fault information within the fault table, shown in FIG. 1, will also include pointers to explanations for the timing elements shown in FIG. 3. The idea is that a crew member, for example, might decide that the crew will be able to complete a repair activity within a shorter time and with less uncertainty than indicated in the original table. This updated information would of course have an effect on the system's decision making process and advice provided.

Figure 4:
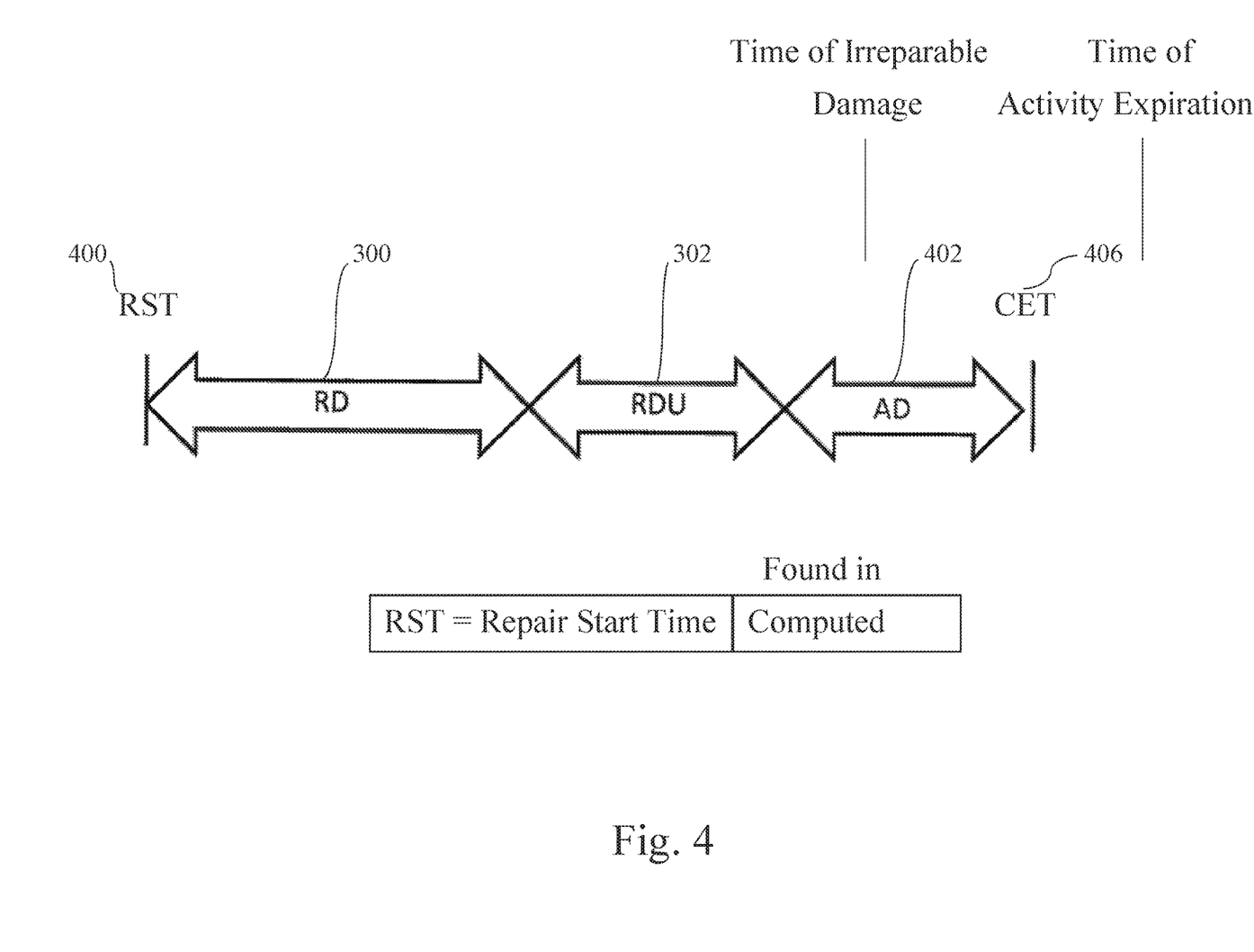
FIG. 4 is another repair timeline according to an illustrative embodiment of the present disclosure.

A function of the Reasoner is to compute both proposed timing information for repair activities and to provide a value of Severity based on the number and criticality of the activities blocked by given faults and the functional failure of all impacted components. The timing calculation is simply algebraic, as shown in FIG. 4, where the latest Repair Start Time (RST, 400) is computed by subtracting the Activity Duration (AD, 402), Repair Duration (RD, 300) and its uncertainty from the Critical Effect Time (CET, 406), but it also needs to take into account the fact that the repair needs to be started before the Time of Irreparable Damage (TID, 308), and that the restored activity needs to be performed before it becomes obsolete (TAE, 210).

Figure 5:
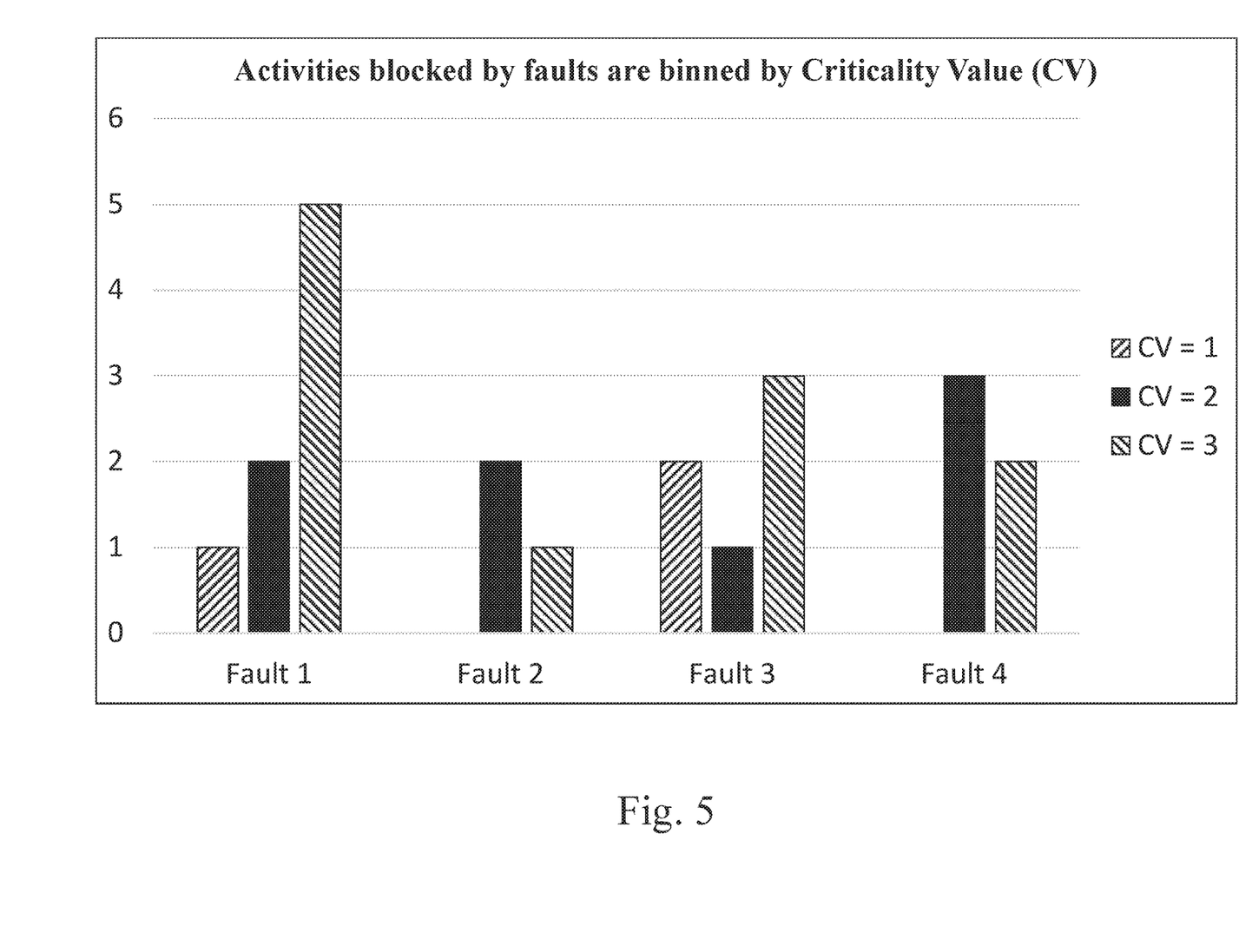
FIG. 5 is a histogram of blocked activities according to an illustrative embodiment of the present disclosure.

The computation of the Severity Value is more complex. The failure response system 100 begins this computation by counting how many activities are blocked by each fault for each Criticality Value (CV). In the example shown in histogram in FIG. 5, for Fault 1 there is one activity with CV=1, two activities with CV=2, and five activities with CV=3. For Fault 2 there are zero activities with CV=1, two activities with CV=2 and one activity with CV=3. The bar graph also shows the histograms for the remaining Faults 3 and 4.

The criticality value range depends on how finely a user or administrator desires to distinguish the criticality of different activities. The number of faults and number of activities affected by the faults varies with the kind of mission that is being planned and system (e.g., space craft) that is being modeled.

Figure 6:
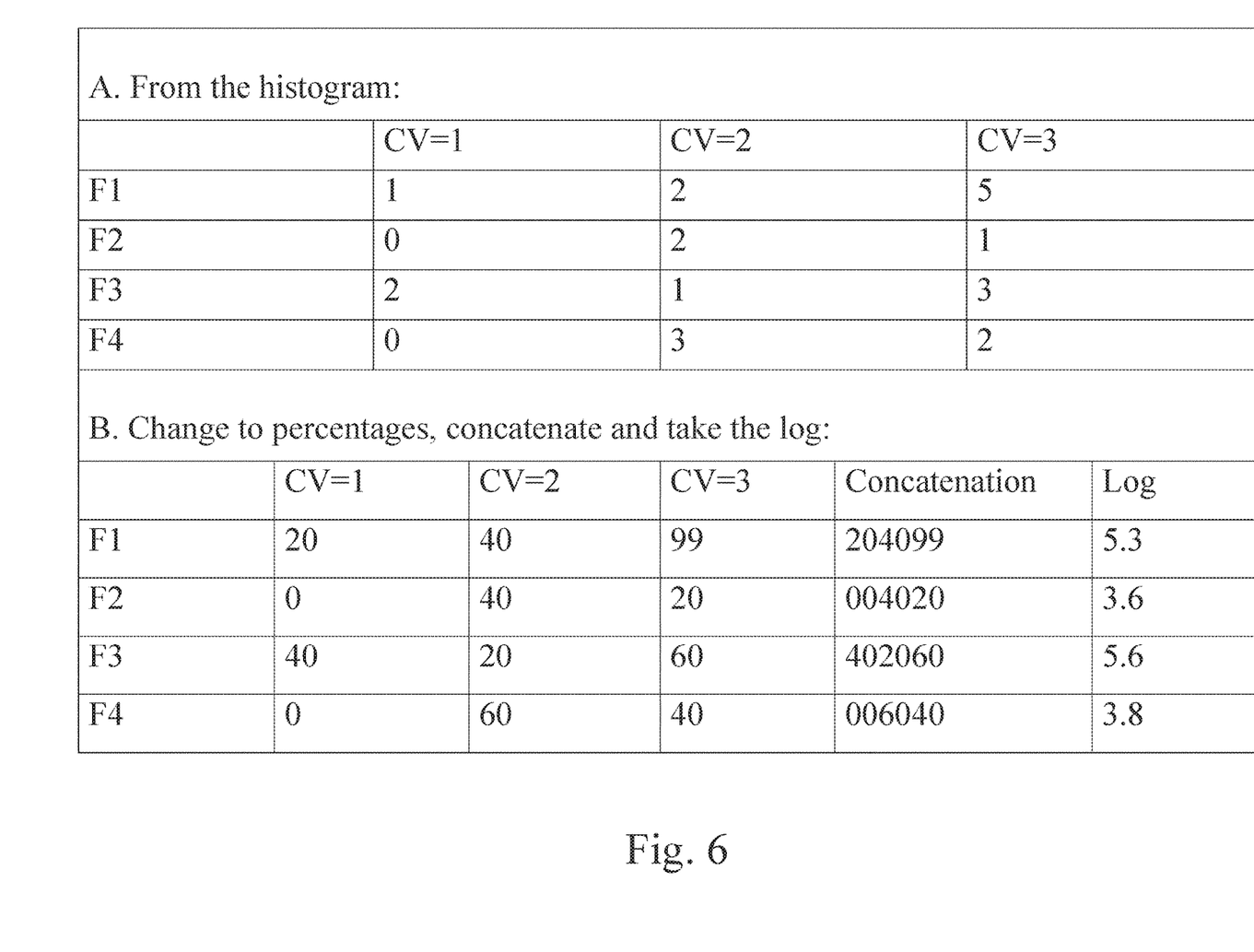
FIG. 6 is a critical value table according to an illustrative embodiment of the present disclosure.

FIG. 6 shows a table representing the next steps taken by the failure response system 100, which is to change the histogram numbers to percentages of the total number of activities that have a given CV in the system. For this example, it can be assumed (at least for this example) that the total number of activities for each CV value is 5. For Fault 1, 5 activities have a CV=3. This is the total number of activities with CV=3 within the system. The number "5" is thus converted to "100%". This can be approximated with "99" to avoid a "spillover" effect that will be explained further below. All other numbers are also converted to percentages of "5". Finally the percentages shown for each fault are concatenated and a Log is taken, as shown in FIG. 6, to obtain a number that can provide an intuitive measurement of what is defined as "Fault Severity."

When approximating 99% to avoid spillover, as suggested above, the extra digit would affect the order of magnitude of the Log function, or, if the "1" were added to the number in the CV=2 column it would imply that "100" activities of CV=3 are worth one activity of CV=2, with the result being tied to into such a quantitative assumption as in how the Criticality Values of different activities are selected.

A final conversion to Log values is not necessary if the objective is to provide a ranking of faults, but such a conversion is useful to identify a simple meaningful number of the same order of magnitude as the Criticality Value even though the meanings are different. Criticality refers only to Activities and is not computed, rather it is assigned a priori on the basis of knowledge of the mission and its systems, whereas Severity refers only to faults and is computed on the basis of the impact of the faults on activities. It is not possible to know the effect of any particular failure until it is known what activities are affected by the lack of resources due to the failure. For example, the failure of a power supply has very different severity if its effect is to prevent a secondary scientific experiment to be performed as opposed to preventing the deployment of a re-entry parachute.

The user interface for the failure response system 100 will be integrated in the framework of the ACAWS interface. In the ACAWS GUI the entire system can be represented in movable panes to show fault locations and fault consequences (impacts). The failure response system 100 GUI is designed mainly with crew interaction in mind, although of course the information provided could facilitate decision support on the ground, and potentially be useful in ground operator training.

Figure 7:
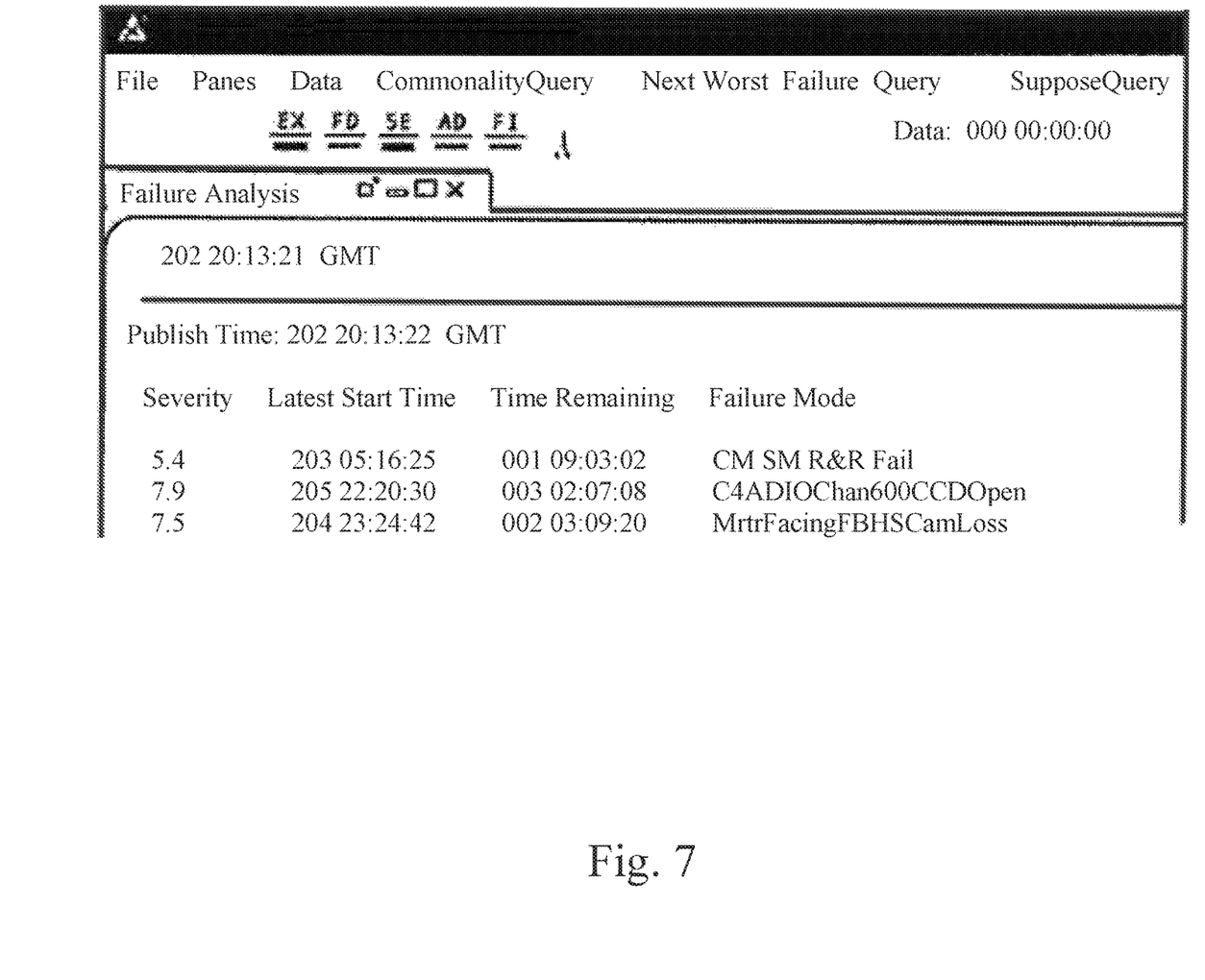
FIG. 7 is a screen shot of a user interface according to an illustrative embodiment of the present disclosure.

A fundamental objective of the failure response system 100 is to provide a simple user interface as described in more detail below. To illustrate this user interface, the following representative example will be used. In this example, a representative mission schedule can be represented with 27 activities and focused on 30 possible faults. All fault and activity information can be stored in the Fault Table and Activity Information Repository, respectively (FIG. 1). Criticality values and timing information can then be constructed simply for the purpose of verifying the computation of severity values and repair start times. In this representative example, three faults are identified in the system (e.g. spacecraft) and their Severity Value is computed, together with the latest start times for repair and time remaining from current time, and these values can be represented by a graphical user interface (GUI), as shown in FIG. 7, and arranged or organized according to the desires of the user or an administrator. FIG. 7 illustrates three faults that are identified by the failure response system 100 and are displayed together with their Severity Values, Latest Start Time for repair procedures, and Time Remaining. The first three-digit number is "day of the year," then the time is displayed in hh:mm:ss.

Figure 8:
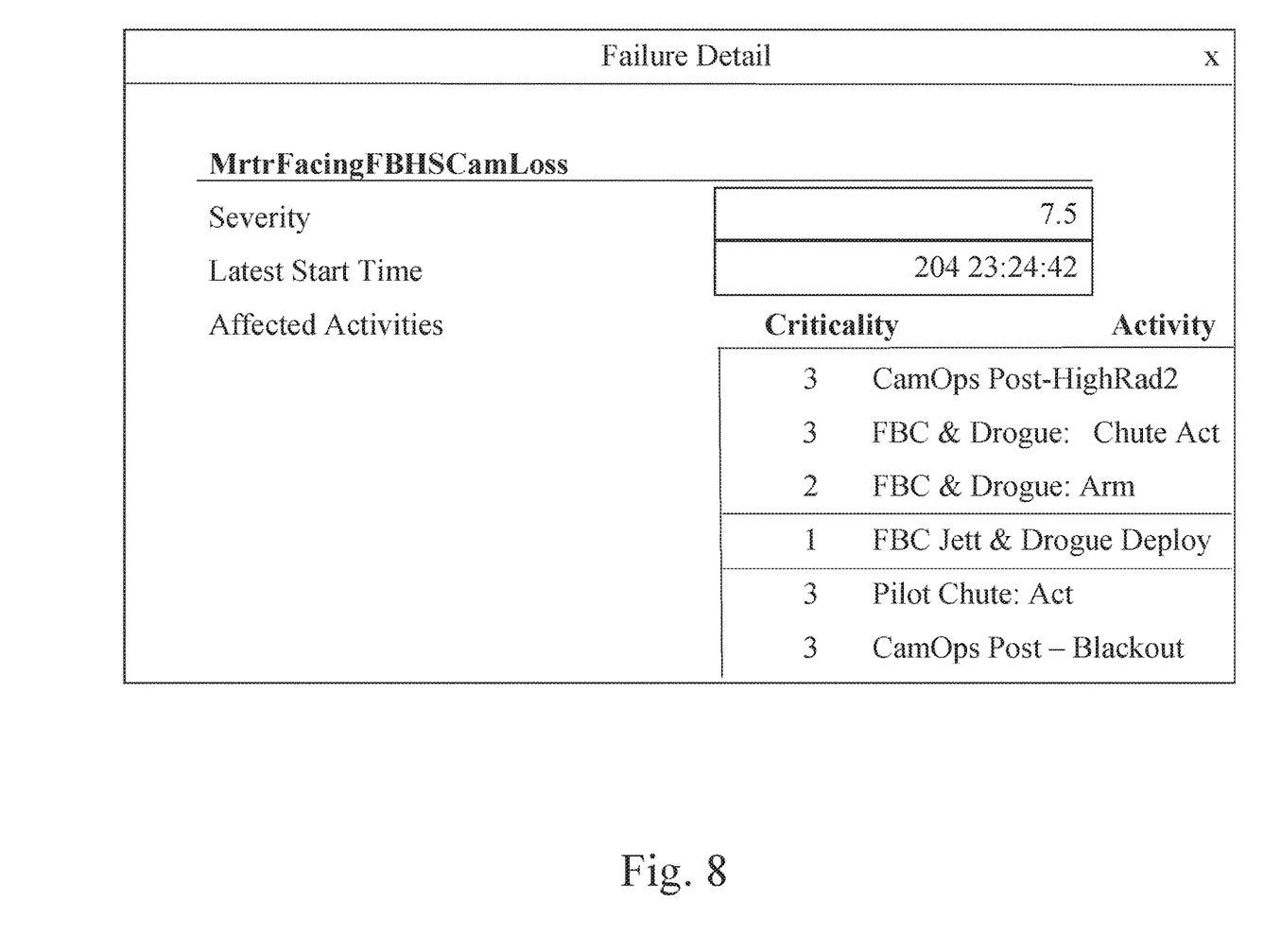
FIG. 8 is another screen shot of a user interface according to an illustrative embodiment of the present disclosure.
Figure 9:
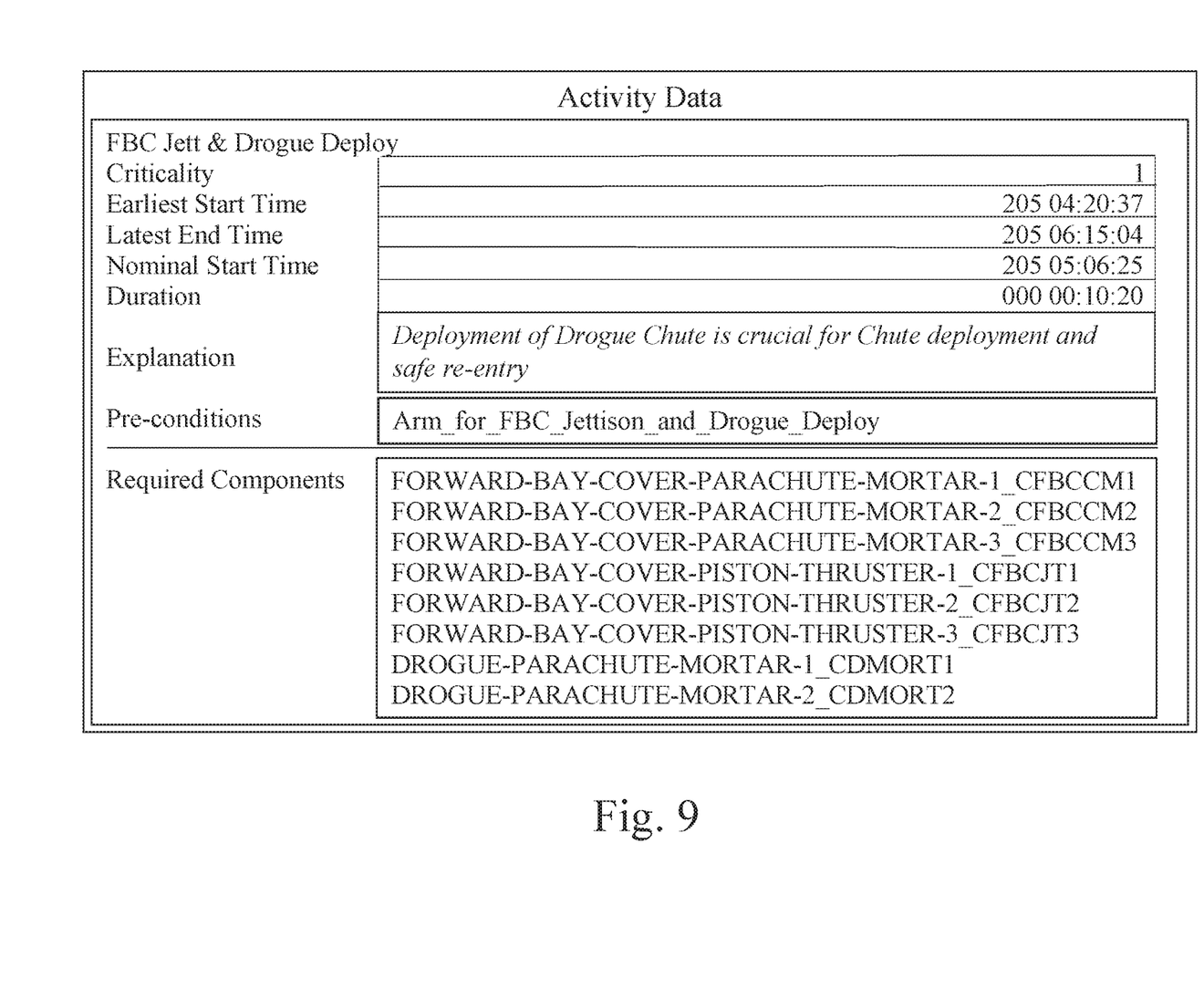
FIG. 9 is another screen shot of a user interface according to an illustrative embodiment of the present disclosure.

The crew of the system or craft can be made aware of the high Severity Value for two of the faults and how much time is left for action, in this representative example. The highest severity is 7.9, but repair can wait 3 days for that problem. The crew can decide to look first at the fault with severity 7.5, represented on the GUI in FIG. 8. As shown in FIG. 8, details of the failure can be shown by the list of activities that are blocked by the failure, together with their Criticality Value (CV). Further information can be retrieved for each activity. One of these activities has Criticality Value of 1, which typically indicates life and/or mission critical events. The presence of this high criticality activity explains the high severity value of the fault. The crew can then investigate deeper into this activity, via the failure response system 100 as shown in FIG. 9, to find when it is scheduled to happen, why it is critical, and what other resources are required for that activity, besides the one that failed. As shown in FIG. 9, the activity with Criticality Value=1 is further examined to see when it is expected to take place (if the fault is repaired), why it has CV=1 and what other resources are required for the activity to be performed. Together these elements form the basis of the decision making process for what needs to be done, when, and why.

Crewed space travel, even as far as the Moon, has been relying on ground support for any kind of decision making regarding systems failures and timing of repair procedures. For deep space travel to the vicinity of Mars and asteroids, communication latencies can be over an hour and the crew may need to be informed more quickly about the gravity of any system failure and about the necessary timing of repair procedures. For this purpose, the capabilities of ACAWS, a diagnostic and failure consequences analysis system, have been extended to provide information on the Severity of failures and timing for initiation of repair procedures. The concept of Severity is quantitative, based on the number and Criticality of activities blocked by the failure. For future implementation an additional pass of the planning system that may be needed to sort out potential conflicts in needed repair procedures and new resource requirements, in light of the failure that have been identified, but, even just with this first step, it is believed that crew action would be guided by clear quantitative information for safer and quicker decision making. The system is also envisioned for use as an operator training tool, where hypothetical faults could be presented and the operator's decisions could be compared with those of the system. Clearly this could become part of the rigorous validation process that would be required for appropriate system accreditation.

Figure 10:
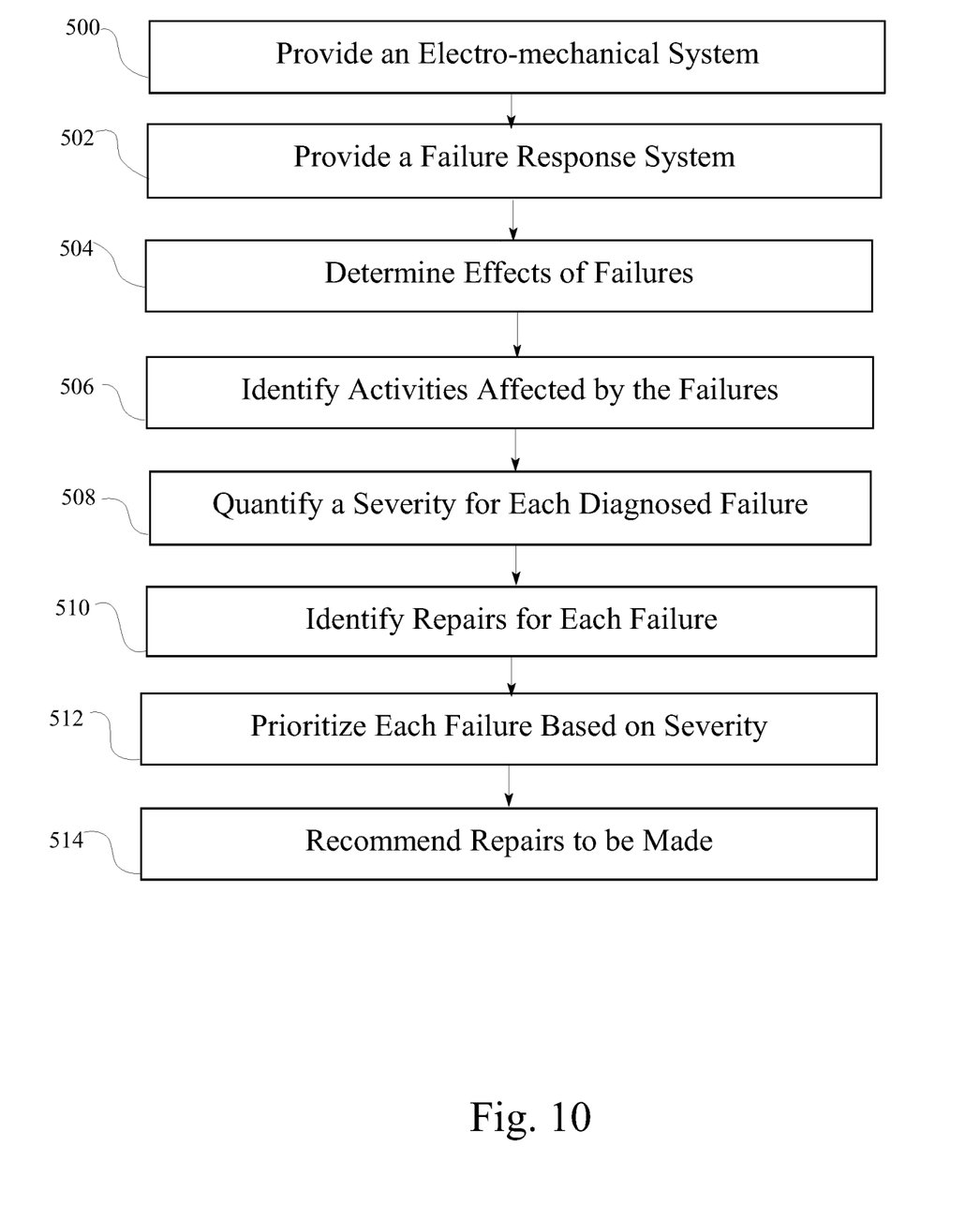
FIG. 10 illustrates a method of warning and planning using an automated failure response system according to an illustrative embodiment of the invention.

FIG. 10 illustrates a method of warning and planning using an automated failure response system according to an illustrative embodiment of the invention. At 500, an electro-mechanical system having mechanical and electrical components is provided. At 502, a failure response system for diagnosing failures of the components is provided. At 504, effects of said failures on carrying out system activities are determined using the failure response system. At 506, activities that are affected by the failures of components are determined. At 508, a severity is quantified for each failure diagnosed by the failure response system. At 510, repairs for each component failure are identified. At 512, each failure of the component is prioritized based on severity. At 514, repairs that should be made are recommended based on the prioritizing of each component failure and the severity of the corresponding failures to keep the electro-mechanical system operational.

In the foregoing Detailed Description, various features of the present disclosure are grouped together in a single or limited illustrative embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed illustrative embodiment. Thus, the following claims are hereby incorporated into this Detailed Description of the Disclosure by this reference, with each claim standing on its own as a separate illustrative embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A computer-implemented method of warning and planning repairs for an electro-mechanical system having electrical components, using an automated failure response system configured to execute the steps of the method comprising:

maintaining, at the failure response system, a list of activities, each activity associated in the list with one or more electrical components on which the activity depends;

receiving, from a diagnostic system, an identification of one or more failures of the electrical components, the identification comprising telemetry values received from the one or more electrical components by the diagnostic system;

receiving, from the diagnostic system, a list of one or more identified components impacted by the one or more failures of the electrical components;

maintaining, at the failure response system, a list of criticality levels associated with each activity of the list of activities;

for every activity of the list of activities, identifying activities that are affected by the failures of components by matching the associated electrical components on which the activity depends with the one or more components impacted, and upon matching, flagging the identified activities as one or more blocked activities;

quantifying a severity for each of the component failures received by the failure response system based on at least a count of the blocked activities due to the component failure and one or more of the criticality values associated with each blocked activity;

identifying repairs for each component failure;

prioritizing each failure of the component based on the severity; and recommending which repairs should be made based on the prioritizing of each component failure, the severity of said each component failure and the criticality values associated with the blocked activities, wherein the recommending which repairs should be made includes causing the recommendations to display via a user interface accessible by a user of the electro-mechanical system.

2. The method of claim 1, wherein said activities have defined time durations, and further comprising determining the time duration of each activity and a length of time needed to carry out repairs of system components.

3. The method of claim 1, wherein the quantifying the severity for each of the component failures includes determining effects of delay in addressing a diagnosed failure.

4. The method of claim 1, wherein the recommending which repairs should be made includes prioritizing repairs based upon timing of when said blocked activities occur.

5. The method of claim 1, wherein the recommending which repairs should be made includes identifying a length of time needed to perform repairs of the failed components.

6. A failure response system for warning and planning repairs of component failures, comprising:

an electro-mechanical system having mechanical and electrical components;

a means for maintaining, at the failure response system, a list of activities, each activity associated in the list with one or more electrical components on which the activity depends;

a means for receiving, from a diagnostic system, an identification of one or more failures of the electrical components, the identification comprising telemetry values received from the one or more electrical components by the diagnostic system;

a means for receiving, from the diagnostic system, a list of one or more identified components impacted by the one or more failures of the electrical components;

a means for maintaining, at the failure response system, a list of criticality levels associated with each activity of the list of activities;
a means for identifying, for every activity of the list of activities, activities that are affected by the failures of components by matching the associated electrical components on which the activity depends with the one or more components impacted, and upon matching, flagging the identified activities as one or more blocked activities;
a means for quantifying a severity for each of the component failures received by the failure response system based on at least a count of the blocked activities due to the component failure and one or more of the criticality values associated with each blocked activity;
a means for identifying repairs for each component failure;
a means for prioritizing each failure of the component based on the severity; and
a means for recommending which repairs should be made based on the prioritizing of each component failure, the severity of said each component failure and the criticality values associated with the blocked activities.

7. The system of claim 6, wherein the means for recommending which repair should be made includes a user interface accessible by a user of the electro-mechanical system.

8. A failure response system for warning and planning repairs of component failures comprising:
an electro-mechanical system having mechanical and electrical components;
a processor;
a memory coupled to the processor; and
computer-readable instructions stored in the memory that, when executed by the processor, cause the processor to:
maintain, at the failure response system, a list of activities, each activity associated in the list with one or more electrical components on which the activity depends;
receive, from a diagnostic system, an identification of one or more failures of the electrical components, the identification comprising telemetry values received from the one or more electrical components by the diagnostic system;
receive, from the diagnostic system, a list of one or more identified components impacted by the one or more failures of the electrical components;
maintain, at the failure response system, a list of criticality levels associated with each activity of the list of activities;
for every activity of the list of activities, identify activities that are effected by the failures of components by matching the associated electrical components on which the activity depends with the one or more components impacted, and upon matching, flagging the identified activities as one or more blocked activities;
quantify a severity for each of the component failures received by the failure response system based on at least a count of the blocked activities due to the component failure and one or more of the criticality values associated with each blocked activity;
identify repairs for each component failure;
prioritize each failure of the component based on the severity; and
recommend which repairs should be made based on the prioritizing of each component failure, the severity of said each component failure and the criticality values associated with the blocked activities.

9. The system of claim 8, wherein said activities have defined time durations, and wherein the computer-readable instructions are further operable, when executed by the processor, to cause the processor to determine the time duration of each activity and a length of time needed to carry out repairs of system components.

10. The system of claim 8, wherein the computer-readable instructions are further operable, when executed by the processor, to cause the processor to, determine effects of delay in addressing a diagnosed failure.

11. The system of claim 8, wherein the computer-readable instructions are further operable, when executed by the processor, to cause the processor to prioritize repairs based upon timing of when said activities occur when recommending which repairs should be made.

12. The system of claim 8, wherein the computer-readable instructions are further operable, when executed by the processor, to cause the processor to identify a length of time needed to perform repairs of the failed components when recommending which repairs should be made.

13. The system of claim 8, wherein the computer-readable instructions are further operable, when executed by the processor, to cause the processor to recommend which repair should be made via a user interface accessible by a user of the electro-mechanical system.

* * * * *